United States Patent [19]
Baker

[11] 3,967,545
[45] July 6, 1976

[54] CONTROLLING THE SUPPLY OF ELECTRIC CURRENT TO A ROOM

[76] Inventor: John Baker, 1 Stewart Ave., Parkdale, Victoria, Australia

[22] Filed: Feb. 10, 1975

[21] Appl. No.: 548,613

[30] Foreign Application Priority Data
Feb. 14, 1974 Australia............................. 6599/74
Feb. 18, 1974 Australia............................. 6638/74
Mar. 22, 1974 Australia............................. 6992/74
Mar. 27, 1974 Australia............................. 7056/74
May 14, 1974 Australia............................. 7556/74
May 31, 1974 Australia............................. 69678/74
Nov. 7, 1974 Australia............................. 9530/74

[52] U.S. Cl. .................................. 98/43 A; 4/213
[51] Int. Cl.² ........................................... F24F 7/00
[58] Field of Search ............. 98/43 A, 33 A; 4/209, 4/211, 213, 218, 145

[56] References Cited
UNITED STATES PATENTS
3,102,275  9/1963  Raymond................................ 4/213
3,192,539  7/1965  Martz..................................... 4/213 X
3,307,469  3/1967  Bohanon......................... 98/43 A X
3,837,011  9/1974  McTighe et al...................... 4/145 X
3,896,509  7/1975  Stipp et al............................... 4/209

Primary Examiner—William E. Wayner
Assistant Examiner—William E. Tapolcai
Attorney, Agent, or Firm—Woodhams, Blanchard and Flynn

[57] ABSTRACT

A method and installation in which electric current supplied to a room is controlled in dependence on the temperature of a pipe for supplying water to an outlet in the room. In a particular application, a steam exhaust fan mounted in a bathroom ceiling is turned on and off at particular predetermined temperatures of a pipe connected to supply hot water to a tap in the room. A general purpose adaptor for inserting electric circuit elements into series in an existing circuit is also disclosed.

17 Claims, 5 Drawing Figures

CONTROLLING THE SUPPLY OF ELECTRIC CURRENT TO A ROOM

FIELD OF THE INVENTION

This invention relates, in one aspect, to a method of controlling the supply of electric current to an outlet or electrically powered device disposed in or adjacent a room and to an installation therefor, and, in a second aspect, to a combination plug and socket adaptor. The invention is of particular though by no means exclusive utility in relation to bathrooms, showers, kitchens, laundries and similar premises.

Electrically powered devices such as, for example, fans, room heaters, towel rails, electrically heated floors and carpets and the like may advantageously be adapted to the invention.

As an example, consider an exhaust fan in a bathroom.

The present exhaust fans for bathrooms have to be switched on and off manually by the occupier. If not switched on, then the room becomes steamy; if not switched off after a bath or shower or the like, then the fan continues to run, with consequent wastage of electricity.

SUMMARY OF THE INVENTION

This invention accordingly provides, in one aspect, a method of controlling the supply of electric current to an outlet or electrically powered device disposed in or adjacent a room wherein the current is controlled in response to variations in the temperature of a pipe for supplying water to a water outlet in the room.

In a second aspect of the invention, there is provided an installation comprising electrical power supply wiring associated with an electrical outlet or electrically powered device disposed in or adjacent a room, a water supply pipe having a water outlet in the room, and means to control the supply of electric current by the wiring to the electrical outlet or device in response to variations in the temperature of the water supply pipe.

The room may be a bathroom, the device a steam exhaust fan and the said means a thermostat secured to a hot water pipe supplying a tap at the bath, shower or washbowl and arranged to conduct current only when the temperature of the pipe exceeds a first predetermined value. When a person using the bath, shower or washbowl turns on the hot water then the hot water supply pipe will become hot and will close the thermostat which will, in turn, switch on the exhaust fan.

The fan will continue to extract steam-laden air from the room for some minutes after the hot water tap has been turned off; i.e., until the hot water supply pipe has cooled sufficiently to cause the thermostat to switch off the fan.

The said control means may be either (1) a part of the electrically powered device; i.e. rigidly or detachably connected to the device but located elsewhere or (2) provided with a separate special adaptor complete with either (a) an integral thermostat or (b) an external thermostat; i.e., a thermostat connected to the adaptor but located elsewhere.

With reference to item (1) supra, future exhaust fans for bathrooms could be manufactured and supplied with a thermostatic control unit forming part of the complete fan assembly. Alternatively, with reference to item (2) in the previous paragraph, existing types of fans including those already installed could be converted to automatic operation simply by fitting a separate special adaptor. In one form, the adaptor consists of a combined plug and socket which includes, or to which is attached, the thermostatic control unit. In general, the invention further provides a combination plug and socket adaptor for use in inserting an electric circuit element into series with an electrical power supply lead, the adaptor including at least two plug terminals and at least two socket terminals wherein a first of the plug terminals is directly electrically connected to a first of the socket terminals and respective second plug and socket terminals are electrically connected to separate outlet terminals or leads for bridging of the said second terminals by said circuit element.

To convert an ordinary existing type of bathroom exhaust fan to automatic operation, the combined plug and socket would be inserted between the existing plug and socket, and a thermostat bridging the said outlet terminals or leads would be attached to the hot water pipe. The existing manual switch would remain in the "ON" position. A time delay switch might be provided to determine switching from manual to thermoresponsive control.

The installation may include means to vary the control of the supply of the electric current in response to variations in ambient temperature in the vicinity of the pipe. This may comprise, for example, additional shunting thermostats having different temperature characteristics.

The abovementioned preferred thermostat whether included in the manufacture of the type of equipment envisaged or supplied as a separate unit, will have either a single thermostat or a plurality of thermostats in order to provide either a cheap product, which will be adequate in many applications, or a more expensive sophisticated product, which will provide better control, additional socket outlets and which will take into account the ambient climatic conditions.

The said control means need not necessarily be on or adjacent a pipe but may instead be in or on or near any other head source such as, for example, a stove or oven.

The word "thermostat", as used herein, includes the singular and the plural; fixed range and variable range thermostats; bi-metal thermostats; and thermostats operated by liquid filled systems. Thermostats of each type may be included in combination. The word "variable" refers to manually adjustable thermostats and to thermostats which compensate for changes in ambient temperature.

The aforementioned adaptor may also of course be used for general purposes in conjunction with other types of circuit elements such as time, pressure, photoelectric, electronic radio-controlled, manual, magnetic, float, electrical and mechanical switches.

BRIEF DESCRIPTION OF THE DRAWINGS

Particular exemplary and best methods of carrying out the invention will now be described with reference to four drawings provided herewith in which.

DESCRIPTION OF THE PREFERRED EMBODIMENTS

Figure 1:
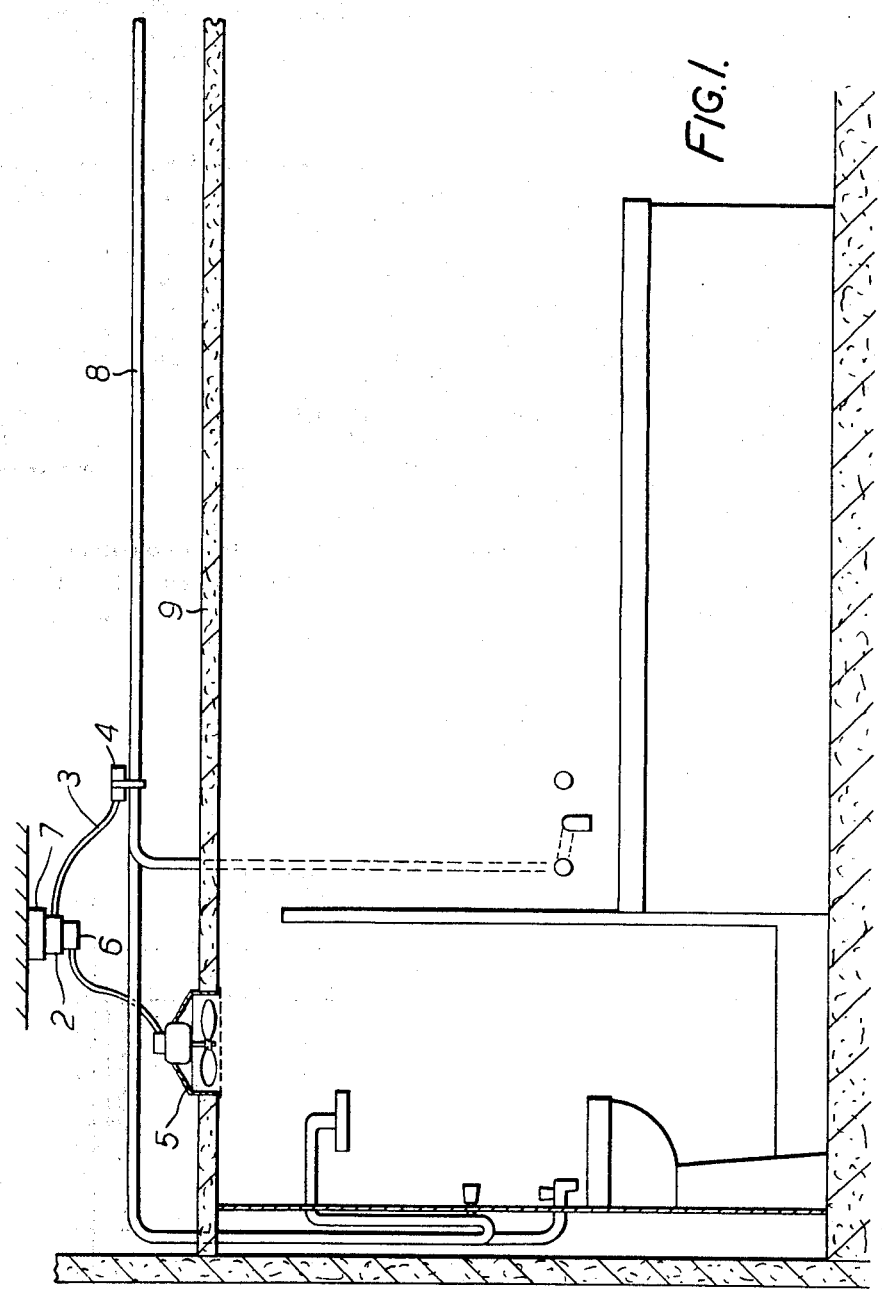
FIG. 1 depicts a bathroom installation in accordance with the invention.

FIG. 1 illustrates, in side elevation, a bathroom installation in accordance with the invention in which an exhaust fan 5 mounted in the bathroom ceiling 9 is switched on and off by a thermostat 4 which is mounted on the hot water supply pipe. Present exhaust fans have a plug 6 which is inserted directly into a socket 7 and the electricity supply is controlled by a manual switch (not shown). In this example, the electricity supply is switched on and off by a special adaptor 2, which is connected by a length of cable 3, to the thermostat 4, mounted on the hot water supply pipe. Thermostat 4 is arranged to close for conduction of current only when a certain temperature is exceeded and to open when the temperature drops below a second temperature a few degrees lower than the closing temperature.

Figure 2A:
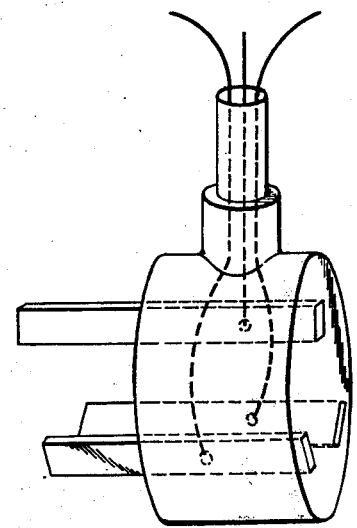
FIGS. 2A and 2B are respectively perspective views of a known three-point adaptor and of an adaptor in accordance with the invention.
Figure 2B:
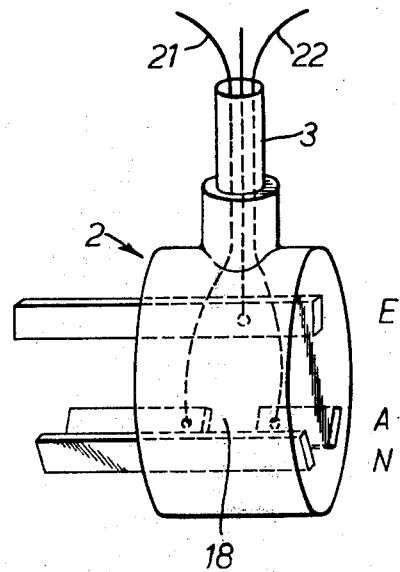

FIG. 2A shows the principal of existing plug adaptors and FIG. 2B shows an adaptor formed in accordance with the invention and having plug and socket terminals located to permit coupling with conventional three-point domestic sockets and plugs. In the latter a gap 18 between the plug active and the socket active terminals may be bridged via leads 21, 22 by the thermostat 4. (not shown on FIG. 2B).

Figure 3:
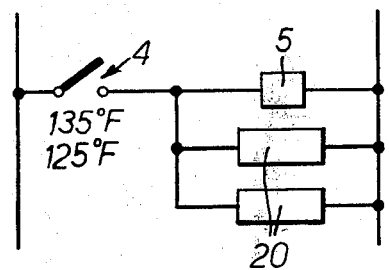
FIG. 3 is a circuit diagram for the installation of FIG. 1.

FIG. 3 is a circuit diagram depicting the series connection of the thermostat 4 and fan 5 to the mains power supply. Additional equipment 20 such as a towel rail, a room heater and the like, can be controlled by the same installation by being wired across the fan as illustrated, or the additional equipment can be controlled by individual thermostats on the hot water pipe.

Figure 4:
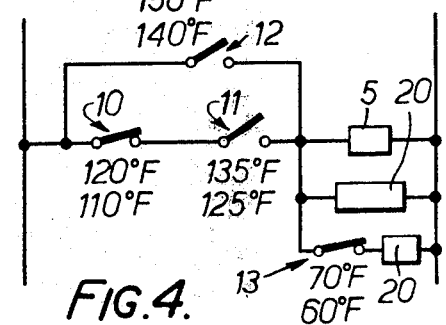
FIG. 4 is a modified circuit diagram incorporating certain additional control features.

FIG. 4 illustrates an example in which a plurality of thermostats control a fan and other equipment in a bathroom during winter and summer conditions. During the latter, in some localities, high temperatures occur in the roof space; such temperatures necessitate ambient control; otherwise the fan and the other equipment may operate unnecessarily and continuously whenever high ambient temperature conditions occur around the pipe and thermostat.

In the example shown in FIG. 4, an ambient thermostat 10 will open as the temperature in the roof space increases, thereby isolating the pipe thermostat 11 having a closing temperature of 135°F and an opening temperature of 125°F. A second shunting pipe thermostat 12 having a closing temperature of 150°F and an opening temperature of 140°F will now control the fan and other equipment, including a room heater, illustrated. Thus, the fan and the other equipment will turn off in cold weather when the temperature of the hot pipe drops below 125°F but in very hot weather, when the ambient temperature may well be about 130°–135°F, they will be arranged to cease functioning when the temperature of the hot pipe drops below 140°F.

Also, when the ambient temperature reaches, say, 70°F, a further thermostat 13 is provided to open thereby isolating the room heater during warm weather.

I claim:

1. A method of controlling the supply of electric current to an electrically powered fan disposed in a room wherein the current is controlled in response to variations in the temperature of a pipe for supplying water to a water outlet in the room.

2. A method according to claim 1 wherein the pipe is connected to supply hot water to the room.

3. A method according to claim 2 wherein the electric current is supplied by way of an electrically conductive lead wired in series with a temperature dependent conductor disposed on or adjacent the pipe.

4. A method according to claim 3 wherein the temperature dependent conductor is a thermostat arranged to conduct current only when the temperature of the pipe exceeds a first predetermined value.

5. A method according to claim 4 wherein the thermostat is arranged to be non-conducting when the pipe temperature falls below a second predetermined value.

6. A method according to claim 4 wherein the said first predetermined value of temperature is arranged to vary with ambient temperature in the vicinity of the pipe.

7. An installation comprising electrical power supply wiring connected to an electrically powered fan disposed in a room, a water supply pipe having a water outlet in the room, and means to control the supply of electric current by the wiring to the electrical fan in response to variations in the temperature of the water supply pipe.

8. An installation according to claim 7 wherein the pipe is connected to supply hot water to the said outlet.

9. An installation according to claim 8 wherein the said means comprises a temperature dependent conductor connected or connectable in series with said wiring and disposed on or adjacent the water supply pipe.

10. An installation according to claim 9 wherein the temperature dependent conductor is electrically connected to an adaptor by means of which it is removably connectable into series with said wiring.

11. An installation according to claim 10 wherein the adaptor comprises a combination plug and socket in which the plug and socket each have at least two terminals and the said temperature dependent conductor is wired in series between a terminal of the plug and a terminal of the socket.

12. An installation according to claim 8 wherein the fan is a steam exhaust fan for the room.

13. An installation according to claim 12 wherein the said means is a thermostat arranged to conduct current only when the temperature of the pipe exceeds a first predetermined value.

14. An installation according to claim 8 wherein the said means is a thermostat arranged to conduct current only when the temperature of the pipe exceeds a first predetermined value.

15. An installation according to claim 14 wherein the fan is a steam exhaust fan mounted in a wall of the room.

16. An installation according to claim 7 further including means to vary the control of the supply of the electric current in response to variations in ambient temperature in the vicinity of the pipe.

17. An installation comprising electrical power supply wiring connected to an electrically powered steam exhaust fan mounted in a wall of a room, a water supply pipe having a water outlet in the room, the pipe being connected to supply hot water to the outlet, and means to control the supply of electric current by the wiring to the fan in response to variations in the temperature of the water supply pipe.

* * * * *